United States Patent [19]

Koike et al.

[11] Patent Number: 5,067,980

[45] Date of Patent: Nov. 26, 1991

[54] RECORDING PROCESS AND LIQUID USING WATER-SOLUBLE ORGANIC SOLVENT

[75] Inventors: Shoji Koike, Yokohama; Yasuko Tomida, Atsugi, both of Japan

[73] Assignee: Canon Kabushiki Kaisha, Tokyo, Japan

[21] Appl. No.: 553,363

[22] Filed: Jul. 17, 1990

Related U.S. Application Data

[63] Continuation of Ser. No. 137,339, Dec. 23, 1987, abandoned.

[30] Foreign Application Priority Data

Dec. 26, 1986 [JP] Japan .................. 61-310825

[51] Int. Cl.$^5$ ............................. C09D 11/02
[52] U.S. Cl. ........................... 106/22; 106/20
[58] Field of Search ..................... 106/20, 22

[56] References Cited

U.S. PATENT DOCUMENTS

| | | | |
|---|---|---|---|
| 4,229,747 | 10/1980 | Hwang | 106/22 |
| 4,281,329 | 7/1981 | Yano et al. | 106/20 |
| 4,325,735 | 4/1982 | Ohta et al. | 106/22 |
| 4,388,115 | 6/1983 | Sugiyama et al. | 106/22 |
| 4,425,162 | 1/1984 | Sugiyama et al. | 106/20 |
| 4,505,749 | 3/1985 | Kanekiyo et al. | 106/20 |
| 4,632,703 | 12/1986 | Koike et al. | 106/23 |
| 4,661,158 | 4/1987 | Kobayashi et al. | 106/22 |
| 4,778,525 | 10/1988 | Kobayashi et al. | 106/22 |

FOREIGN PATENT DOCUMENTS 0202656 11/1986 European Pat. Off. .

OTHER PUBLICATIONS

Patent Abstracts of Japan, vol. 8, No. 85 (C-219)[1522], Apr. 18, 1984; & JP-A-59 4665 (Sumitomo Kagaku Kogyo K.K.) 11-01-84.

*Primary Examiner*—William R. Dixon, Jr.
*Assistant Examiner*—Helene Klemanski
*Attorney, Agent, or Firm*—Fitzpatrick, Cella, Harper & Scinto

[57] ABSTRACT

A recording liquid suitable for use as an ink in an ink jet printing system essentially contains water and a water-soluble organic solvent which dissolves not less than 3 wt. % of a coloring matter which has a water-solubility not greater than 0.1 wt. %. The water-soluble organic solvent has a surface tension not greater than 45 dyne/cm. The recording liquid further contains a surfactant. The recording solution, when used as an ink in an ink jet printing system, can print letters and other information with high degree of stability of the ink jet over a wide range of operating conditions and superior fixing characteristic, as well as high durability of the print against water, even when the printing is conducted on a recording medium having exposed fibers such as an ordinary paper.

14 Claims, No Drawings

RECORDING PROCESS AND LIQUID USING WATER-SOLUBLE ORGANIC SOLVENT

This application is a continuation of application Ser. No. 137,339, filed Dec. 23, 1987, now abandoned.

FIELD OF THE INVENTION AND RELATED ART

The present invention relates to a recording liquid which is capable of recording characters, patterns and other information on paper specific for ink jet printing as well as conventional paper for office and household use such as copying paper, letter paper, bond paper, continuous form papers, and so forth and cloth. More specifically, the present invention relates to a recording liquid which is capable of recording on such media at a high fixing speed with a high level of durability. The present invention is also concerned with a recording method which utilizes such recording liquid.

Ink jet recording methods have been known in which tiny minute droplets of recording liquid are made to fly and attach to recording media such as paper sheets. Various methods have been proposed for forming such droplets, such as a method which utilizes electrostatic attraction, a method which utilizes mechanical vibration caused by piezoelectric elements, and a method which makes use of pressure generated in a heated recording liquid.

Usually, the recording liquid (also referred to as "ink") is a liquid in which a dyestuff is dissolved in water or in a water-soluble organic solvent. Such recording liquids are required to meet a wide variety of disparate requirements according to the type of recording method which is intended. There are, however, certain requisites which commonly have to be met by recording liquids regardless of how it will be utilized. These requirements include the following:

1) The recording liquid should ensure a high quality recorded image with minimal feathering.
2) High fixing speed of ink image.
3) Superior durability (such as weather-resistance and light-resistance) of the printed image.
4) Prevention of clogging of ink in ink passages.
5) High stability of ink discharging characteristic over prolonged periods of ejection.
6) High stability of ink properties during long storage.

Intense studies have been made to develop recording liquids and ink jet recording apparatus which are capable of satisfying some or all of the requirements listed above. In fact, some of these requirements have already been satisfied to commercially appreciable degrees.

In most cases, however, the requirement concerning fixing speed can not be met especially when the recording is made on recording media other than recording paper which has been specifically designed for ink jet recording. This problem is attributable to the fact that most prior art recording liquids contain, for the purpose of preventing clogging, a water-soluble organic solvent which has low volatility and a surface tension of above 45 dyne/cm (at room temperature), such as a glycol, e.g., ethylene glycol and diethylene glycol, and glycerine.

These types of solvent also tend to hamper the stability of the ink discharge characteristics, often resulting in wide fluctuation in the ink discharge performance. Therefore, careful consideration is required to match the properties of the ink and the various requirements of the ink jet system under varying operating conditions.

Most recording liquids of the kind described above contain water-soluble dyestuffs such as direct or acidic dyestuffs. Such recording liquids, when used in ink jet recording, pose a problem in that the durability of the recorded image deteriorates, particularly the waterproofness of the recorded image. This is most common when a sheet of paper with fibers exposed to the recording surface, or a cloth, is used as the recording medium.

Various methods have been proposed in which aqueous inks of pigment-dispersion type are used in order to improve the durability of the recorded image, as in Japanese Patent Laid-Open Publication No. 147859/1981. Although such aqueous inks satisfy the demand for the durability of recorded image to an appreciable degree, on the other hand such ink poses problems such as clogging of the ink within ink jet nozzles and lower stability during long storage, as compared with conventional inks of dissolved dyestuffs.

SUMMARY OF THE INVENTION

Accordingly, an object of the present invention is to provide a recording liquid and a recording method using such recording liquid, wherein the recording liquid exhibits good fixing characteristic and superior durability, particularly waterproofness, on both paper which is specifically designed for ink jet printing and on ordinary paper having fibers exposed on the recording surface, particularly sized paper such as copying paper, letter paper, bond paper, continuous form paper, and so forth.

Another object of the present invention is to provide a recording liquid and a recording method using such recording liquid, wherein the recording liquid exhibits high stability regarding its discharge characteristics over a wide range of driving and ambient environmental condition, as well as excellent shelf stability and a reduced tendency to experience clogging.

To these ends, according to one aspect of the present invention, there is provided a recording liquid, comprising a colorant, a water-soluble organic solvent, a surfactant and from 20–95 wt. % water, the organic solvent having a surface tension of at most 45 dyne/cm, wherein the colorant is at most 0.1 wt. % soluble in water at 20° C. and at least 3 wt. % soluble in the solvent.

According to another aspect of the invention, there is provided a method of recording by selecting a recording liquid comprising a colorant, a water-soluble organic solvent, a surfactant and from 20–95 wt. % water, the organic solvent having a surface tension of at most 45 dyne/cm, wherein the colorant is at most 0.1 wt. % soluble in water at 20° C. and at least 3 wt. % soluble in the solvent and impacting droplets of such liquid using an ink-jet system onto a surface of a recording medium having exposed cellulose fibers.

DESCRIPTION OF THE PREFERRED EMBODIMENTS

One of the critical features of the present invention resides in that the coloring matter or colorant contained in the recording liquid has a solubility in water of 0.1% or lower at 20° C. This is because images or other types of information recorded with such recording liquid containing a coloring matter having a low solubility in water exhibit superior durability, particularly waterproofness. If the coloring matter has a solubility in water of above 0.1%, the above-mentioned waterproofness is not perfect.

Another critical feature of the invention resides in that the recording liquid is prepared as a dissolved coloring matter-type ink comprising water and a water-soluble organic solvent which dissolves, based on the weight (e.g., 100 g) thereof, at least 3% of the coloring matter at 20° C. and which has a surface tension not greater than 45 dyne/cm at 25° C.

The dissolution-type nature of the ink or recording liquid of the present invention enables the values of factors such as the coloring matter density, viscosity and surface tension to be varied rather easily. In addition, this recording liquid does not contain any insoluble or precipitatable matter, so that the tendency for the ink supply passages and ink nozzles to be clogged with the ink is remarkably suppressed. Thus, the recording liquid of the present invention exhibits higher storage stability and higher adaptability to ink jet printing than known recording liquid of pigment-dispersion type, and completely eliminates problems which have been encountered by recording apparatus operable with known recording liquid.

In the present invention, it is preferred that the water-soluble organic solvent dissolves, 5% or more, preferably 10% or more, of the coloring matter at 20° C. In such case, the above-mentioned storage stability may be further improved.

The water-soluble organic solvent having a surface tension of at most 45 dyne/cm essentially contained in the recording liquid, enables the recording liquid to be stably discharged over a wide range of operation for a variety of types of nozzle, and provides a superior fixing characteristic even on recording media having fibers exposed on their surfaces.

As described above, since the organic solvent sufficiently dissolves the coloring matter, the ink of the present invention has sufficient homogeneity and storage stability even in a system which does not contain a surfactant. For example, the coloring matter is not separated from such system substantially when the system is subjected to a centrifugal separation. More specifically, the ink of the present invention, even without a surfactant, does not produce a precipitate at the bottom of a glass centrifuge tube when the ink has been subjected to a centrifugal separation for 5 min at 10,000 rpm.

Since the ink of the present invention, however, further comprises a surfactant in combination, performances peculiar to an ink-jet system, particularly the stability in the ink discharge characteristic and the fixing characteristic on plain paper, are markedly improved as compared with a system consisting of water, a coloring matter and a water-soluble organic solvent. Further, the ink of the present invention retains its stability under severe storage conditions, e.g., at 40° C. for 3 weeks.

The aqueous and coloring-matter-dissolution-type recording liquid of the present invention is composed of the following components.

The coloring matter or colorant contained in the recording liquid may be of any type, provided that it exhibits a water solubility of 0.1% or below at 20° C., and can be selected in accordance with the type and amount of the solvent, from a group of acidic dyestuffs, direct dyestuffs, vat dyestuffs, oil-soluble dyestuffs, sulfide dyestuffs, dispersion dyestuffs, etc. Amongst these dyestuffs, oil-soluble dyestuffs are used most preferably. Examples of such oil-soluble dyestuffs include: dyestuffs produced by Hodogaya Kagaku Kogyo Kabushiki Kaisha under the generic name of "AIZEN SPILON", such as AIZEN SPILON Black NPH, AIZEN SPILON Black GMH special, and so forth; dyestuffs produced by Orient Kagaku Kogyo Kabushiki Kaisha under the generic name of "OIL", such as OIL Black HBB, OIL Black BY, and so forth; dyestuffs produced by CibaGeigy under the generic name of "ORASOL", such as ORASOL Black RL Pure, ORASOL Black CN, and so forth; and dyestuffs produced by BASF under the generic name of "NEOZAPON", such as Neozapon Black X 57.

The content of the coloring matter is determined in accordance with the type of the solvent and the properties of the recording liquid to be obtained. In general, however, the content of the coloring matter to the total weight of the ink ranges between 0.2 and 20 wt. %, preferably 0.5 and 10 wt. % and most preferably 1 and 5 wt. %.

The solvent suitably used as a first essential component in combination with the coloring matter of the type mentioned above may be a water-soluble (or water-miscible) organic solvent which is capable of dissolving at least 3% of the coloring matter at 20° C. and having a surface tension which is at most 45 dyne/cm at 25° C., preferably 41 dyne/cm or less at 25° C. The water-soluble organic solvent may preferably be capable of mixing with water in all proportions. Although any solvent can be used as long as the abovementioned requirements are met, it is preferred that the solvent has a vapor pressure not higher than 0.5 mmHg at 25° C. Further, the solvent may preferably have a boiling point of 210° C. or higher.

Practical examples of the solvent suitably used include: nitrogen-containing ring compounds such as 1,3-dimethyl-2-imidazolidinone; and mono- or di-alkylethers of alkylene glycol adducts such as monomethyl ether of triethylene glycol and dimethyl ether of tetraethylene glycol.

The solvent serves firstly as a solubilizing agent for allowing the coloring matter which is insoluble in water to be contained in an aqueous ink of dissolution type, secondly as a penetrant which provides a high fixing performance even on recording mediums with exposed fibers, and thirdly as a stabilizer which ensures a high stability of discharge performance over a wide range of discharging operation.

The content of the solvent to the total weight of the ink generally ranges between 5 and 80 wt. %, preferably between 5 and 60 wt. % and more preferably between 10 and 50 wt. %.

Water, which is a second essential component, is used for various purposes such as prevention of corrosion of ink printer structural members, suppression of odor, reduction in inflammability, prevention of bleeding of ink dots, and so forth. The content of water to whole ink ranges between 20 and 95 wt. %, preferably between 30 and 90 wt. %, more preferably between 40 and 90 wt. %, and most preferably between 60 and 90 wt. %.

Any water content below 20 wt. % cannot provide satisfactory effects in prevention of ink dot feathering and other requirements. On the other hand, water content exceeding 95 wt. % undesirably hampers the dye-solubility so as to make it difficult to attain high density of the recording liquid.

The ink recording liquid in accordance with the present invention essentially contains a coloring matter, a solvent and water as explained above. Further, the recording liquid contains a surfactant as a third essential component.

Examples of the surfactant suitably used include: anionic surfactants such as fatty acid salt, alkyl sulfate, alkyl benzene sulfonate, alkyl naphthalene sulfonate, dialkyl sulfosuccinate, alkyl phosphate, naphthalene sulfonic acid-formaldehyde condensate, polyoxyethylene alkyl sulfate; and nonionic surfactants such as polyoxyethylene alkylether, polyoxyethylene alkyl phenylether, polyoxyethylene fatty acid ester, sorbitan fatty acid ester, polyoxyethylene sorbitan fatty acid ester, polyoxyethylene alkylamine, glycerine fatty acid ester, oxyethylene oxypropylene block polymer and so forth. Among these, a nonionic surfactant may particularly preferably be used in view of solution stability at a low temperature.

In the present invention, the surfactant used may preferably have an HLB of 5-20, more preferably 6-19, particularly preferably 7-18.

The amount of the surfactant used is determined in accordance with factors such as the type of the coloring matter, density of the recording liquid, and so forth. In general, however, the surfactant content ranges between 0.05 and 10 wt. % preferably 0.05 and 5 wt. %, more preferably 0.05 and 3 wt. %, to the total weight of the recording liquid. A surfactant content below 0.05 wt. % will not produce any appreciable effect on dissolution stability and penetrability. Conversely, a surfactant content exceeding 10 wt. % causes undesirable effects such as a reduction in the surface tension and a rise in the viscosity, thus impairing the ink discharge performance.

In addition to the surfactant explained above, the recording liquid of the present invention can contain various additives as desired, such as a viscosity controlling agent, a surface tension controlling agent, a fluorescent brightening agent, a pH controlling agent, an antimildew agent and chelating agent.

When the recording liquid of the invention is intended for use in ink jet recording system of the type in which the ink is charged electrostatically, the ink or the recording liquid can contain a specific resistance adjusting agent such as an inorganic salt, e.g., lithium chloride, ammonium chloride and sodium chloride. When the recording liquid is used in ink jet recording system of the type in which the ink is discharged by the action of heat energy, thermal physical values such as specific heat, thermal expansion coefficient and heat conductivity may be adjusted as desired.

When the recording is to be conducted on a recording paper with exposed fibers or on a cloth, it is desired that the recording is conducted in such a way as to avoid bleeding of dots and to ensure a high durability of the recorded image, as well as good fixing characteristic. To this end, the recording liquid of the invention preferably has a surface tension which ranges between 30 and 65 dyne/cm at 25° C. and a viscosity which ranges between 1 and 15 cP at 25° C.

The ink or recording liquid in accordance with the present invention simultaneously achieves both the advantages of known aqueous dissolution-type liquid containing a direct dyestuff or an acidic dyestuff, i.e., prevention of clogging and high stability during long storage, and the advantage of pigment dispersion type, i.e., very high durability, particularly resistant to water or moisture.

Furthermore, the recording liquid of the present invention ensures stable liquid discharge over wide ranges of driving and environmental conditions and superior fixing characteristics even on recording media having cellulose fibers exposed on the outside surface thereof.

Some examples of the recording liquid in accordance with the present invention will be shown below together with comparative examples. In the description of such examples, the term "parts" or "%" is used to mean "parts by weight" or "percent in weight (wt. %)".

EXAMPLE 1

A mixture was prepared from the following components:

| | |
|---|---|
| AIZEN SPILON Black NPH (commercial name of a product of Hodogaya Kagaku Kogyo K.K., insoluble to water) | 6 parts |
| tetraethylene glycol dimethyl ether (surface tension: 31 dyne/cm at 25° C.) | 30 parts |

The mixture was stirred for 3 hours at 40° C. and was press-filtrated by a filter which is sold under commercial name of Fluoropore Filter from Sumitomo Denko Kabushiki Kaisha having a pore size of 2 μm. The filtrate was dripped into 70 parts of 0.1% aqueous solution of an anionic surfactant sold under the commercial name of Ionet D-2 from Sanyo Kasei K.K. and the mixture was stirred for 5 hours at 10° C. The mixture was then press-filtrated by a filter named Fluoropore Filter available from Sumitomo Denko K.K. and having a pore size of 1 μm, whereby an ink A as a recording liquid in accordance with the present invention was obtained.

Ink A was subjected to a test printing on an actual ink jet printer of the type which utilizes heat-generating elements as the source of the ink discharging energy. The ink jet printer employed in the test was Model BJ-80 mfd. by Canon K.K., (which had 24 nozzles each having an orifice size of 40×50 μm and a heater size of 30×150 μm, and was driven by a driving voltage of 24.5 V at a frequency of 2 KHz). The test printing was conducted on commercially available copying papers and bond papers, while employing successively elevated frequencies such as 3 KHz and 4 KHz for the purpose of evaluating the stability of the discharge performance. Then, the printed images were evaluated both in water-resistance and fixing characteristic.

Another test was conducted for the purpose of examining the clogging tendency of the ink. This test was carried out by keeping the printer capped in an inoperative state for 1 month at 40° C., operating the printer to print three lines of characters, cutting-off the power supply, and examining the condition of 24 nozzles to investigate the number of clogged nozzles. The results of these tests and the physical values of the ink are shown in Table 1.

EXAMPLE 2

A mixture was formed from the following components:

| | |
|---|---|
| OIL Black HBB (product from Orient Kagaku Kogyo K.K., insoluble in water) | 5 parts |

-continued

| Triethylene glycol monomethyl ether (surface tension: 36.0 dyne/cm at 25° C.) | 50 parts |
|---|---|

The mixture was stirred for 3 hours at 40° C. and was press-filtrated by a filter named Fluoropore Filter available from Sumitomo Denko Kabushiki Kaisha and having a pore size of 2 μm. The filtrate was then dripped into 50 parts of 2% aqueous solution of a nonionic surfactant available as Emulgen 911 from Kawo K.K. having an HLB of 13.7. The mixture was stirred for 5 hours at 10° C. and was then press-filtrated by a filter named Fluoropore Filter available from Sumitomo Denko K.K. and having a pore size of 1 μm, whereby an ink B as a recording liquid of the invention was obtained. Ink B was tested and evaluated under the same conditions as ink A, and the results are shown in Table 1.

EXAMPLE 3

A mixture was formed from the following components:

| ORAZOL BLACK RL Pure (available from Ciba-Geigy, water-solubility: 0.1% or less) | 6 parts |
|---|---|
| 1,3-dimethyl-2-imidazolidinone (surface tension: 41.0 dyne/cm at 25° C.) | 30 parts |

The mixture was stirred at 40° C. for 3 hours and was press-filtrated by a filter named Fluoropore Filter available from Sumitomo Denko K.K. and having a pore size of 2 μm. The filtrate was then dripped into 70 parts of 2% aqueous solution of a nonionic surfactant (trade name: NP-15, available from Nikko Chemicals K.K., HLB=18.0). The mixture was stirred for 30 minutes at 50° C. and was then cooled to 10° C. and further stirred for 5 hours. Then, the mixture was press-filtrated by a filter named Fluoropore Filter available from Sumitomo Denko Kabushiki Kaisha and having a pore size of 1 μm, whereby an ink C as a recording liquid of the invention was obtained. Ink C was tested and evaluated under the same conditions as ink A, and the results are shown in Table 1.

EXAMPLE 4

A mixture was formed from the following components:

| Neozapon Black X57 (available from BASF, insoluble in water) | 5 parts |
|---|---|
| Triethylene glycol monoethyl ether | 50 parts |

The mixture was stirred at 40° C. for 3 hours and was press-filtrated by a filter named Fluoropore Filter available from Sumitomo Denko K.K. and having a pore size of 2 μm. The filtrate was then dripped into 50 parts of a mixture containing 90% of water, 8% of ethylene glycol, 0.5% of a nonionic surfactant having an HLB of 11.5 (trade name: BC-7, available from Nikko Chemicals K.K.), and 1.5% of a nonionic surfactant having an HLB of 17.0 (trade name: BC-20TX, available from Nikko Chemicals K.K.) adjusted to pH 10 by a 0.1% aqueous solution of sodium hydroxide. The mixture was stirred for 30 minutes at 50° C. and was cooled to 10° C. and further stirred for 5 hours. Then the mixture was press-filtrated by a filter named Fluoropore Filter available from Sumitomo Denko K.K. and having a pore size of 1 μm, whereby an ink D as a recording liquid of the invention was obtained. Ink D was tested and evaluated under the same conditions as ink A, and the results are shown in Table 1.

EXAMPLE 5

An ink E as a recording liquid of the present invention was obtained by the same procedure as that in Example 1, except that the AIZEN SPILON Black NPH used in Example 1 was substituted by AIZEN SPILON Black GMH Special which is available from Hodogaya Kagaku Kogyo K.K. and insoluble in water. Ink D was tested and evaluated under the same conditions as ink A, and the results are shown in Table 1.

EXAMPLE 6

A mixture was formed from the following components:

| ORASOL BLACK CN (available from Ciba-Geigy, insoluble in water) | 4 parts |
|---|---|
| 1,3-dimethyl-2-imidazolidinone | 25 parts |
| dipropylene glycol | 5 parts |

The mixture was stirred at 40° C. for 3 hours and was press-filtrated by a filter named Fluoropore Filter available from Sumitomo Denko Kabushiki Kaisha and having a pore size of 2 μm. The filtrate was then dripped into 70 parts of a 1% aqueous solution of a nonionic surfactant (trade name: R-1020, available from Nikko Chemicals K.K.). The mixture was stirred for 30 minutes at 50° C. and was cooled to 10° C. and further stirred for 5 hours. Then the mixture was press-filtrated by a filter named Fluoropore Filter available from Sumitomo Denko K.K. and having a pore size of 1 μm, whereby an ink F as a recording liquid of the invention was obtained. Ink F was tested and evaluated under the same conditions as ink A, and the results are shown in Table 1.

COMPARISON EXAMPLE 1

An ink G as a comparison example was obtained by the same procedure as that in Example 1, except that the AIZEN SPILON Black NPH used in Example 1 was substituted by C.I. Food Black having water-solubility of 20% or greater.

COMPARISON EXAMPLE 2

An ink H as another comparison example was obtained by the same procedure as that in Example 3, except that 1,3-dimethyl-2-imidazolidinone used in Example 3 was substituted by diethylene glycol having a surface tension of 48.5 dyne/cm.

COMPARISON EXAMPLE 3

(Preparation of pigment-dispersion ink)

An ink I composed of the following components was prepared as still another comparison example.

| carbon black | 10 parts |
|---|---|
| ethylene glycol | 20 parts |
| sorbitan | 5 parts |
| sodium hydroxide | 0.5 part |
| nonionic surfactant (commercial name: Emulgen 931 from Kawo K.K.) | 0.1 part |

-continued

| water | 70 parts |
|---|---|

The ink I was prepared by stirring at room temperature a mixture of water and sodium hydroxide, successively adding Emulgen 931, ethylene glycol and other components, pre-mixing the mixture by a stirring machine, grinding the mixture by a ball mill for 20 hours, and press-filtrating the ground mixture by a membrane filter named Fluoropore Filter available from Sumitomo Denko K.K. and having a pore size of 1 μm.

COMPARISON EXAMPLE 4

An ink J as another comparison example was obtained by the same procedure as that in Example 3, except that the 2% aqueous solution of nonionic surfactant NP-15 used in Example 3 was substituted by water.

Comparison Examples G to J were subjected to the same tests and evaluation as Examples 1 to 6 (A to F) of the ink in accordance with the present invention, the results of which are shown in Table 1 together with the physical properties thereof.

The evaluation was conducted by measuring various physical values and factors as follows.

Measurement of Viscosity

Measured by a viscosity meter VISCONIC ELD available from Tokyo Keiki Seizo K.K.

Measurement of Surface Tension

Measured by a surface tension meter KYOWA CBVP A-1 available from Kyowa Kagaku K.K.

Measurement of Stability in Long Storage

Inks were preserved in glass containers at 40° C. for 3 weeks and where visually checked for production of foreign matter.

A mark ○ represents that no foreign matter was observed, while a mark Δ represents that slight foreign matter was observed and a mark x represents that foreign matter was observed.

Evaluation of Resistance to Water

Alphabetic letters A to Z were printed on commercially available copy papers and bond papers. The printed matters were exposed to air for 1 full day and were dipped in water for 5 minutes. An examination was conducted to check for any flow of ink from the printed characters and contamination of white blank portion of papers.

A mark ○ represents that no flow of ink nor contamination of white blank portion was observed. A mark Δ represents that partial flow of ink and slight contamination of white blank portion were observed. A mark x represents that the characters have become unreadable due to flow of the ink and contamination was observed.

Evaluation of Fixing Characteristic

Alphabetic letters A to Z were printed on copy papers and bond papers and the surfaces of the papers carrying the printed letters were rubbed 10 and 30 seconds after the printing, by a filter paper No. 5C available from Toyo Kagaku Sangyo K.K. The following evaluation marks are used.

⊚: No blurring observed when rubbed 10 seconds after print

○: Slight blurring observed when rubbed 10 seconds after print

Δ: Slight blurring observed when rubbed 30 seconds after print x: Heavy blurring observed when rubbed 30 seconds after print Evaluation of Anti-Clogging Tendency Evaluation was conducted by comparing the numbers of clogged nozzles out of 24 nozzles.

○: No nozzle clogged

Δ: One to three nozzles clogged x : Four or more nozzles clogged

Evaluation of Discharge Stability

The quality of the printed letters was visually checked for any defect attributable to unstable jetting of ink, such as blur, blanking, splash and skew of letters, for the letters printed at driving frequencies of 2, 3 and 4 KHz.

A symbol ○ represents that ink droplets were discharged with good response to printing input signal at every frequencies so that no defect such as blur, white blanking and so forth, attributable to unstable jet of ink, was observed both in the letter portions and solid portion. A symbol Δ means that slight blur of letters was observed at higher frequencies, i.e., 3 KHz and 4 KHz, though ink droplets were discharged with almost good response to printing input signal at 2 KHz so that no defect such as blur, white blanking and unstable jet of ink was observed in the letter portions at the driving frequency of 2 KHz. A symbol x represents that stable discharge of ink droplets could not be attained at higher frequencies of 3 KHz to 4 KHz.

TABLE 1

| | | Physical properties (25° C.) | | | Water resistance | | Fixing characteristic | | | |
|---|---|---|---|---|---|---|---|---|---|---|
| | Ink | Viscosity (cP) | Surface tension (dyne/cm) | Storage stability | Copy paper | Bond paper | Copy paper | Bond paper | Anti-clog characteristic | Discharge stability |
| Example | | | | | | | | | | |
| 1 | A | 3.4 | 48 | ○ | ○ | ○ | ⊚ | ○ | ○ | ○ |
| 2 | B | 4.5 | 40 | ○ | ○ | ○ | ⊚ | ⊚ | ○ | ○ |
| 3 | C | 2.7 | 45 | ○ | ○ | ○ | ⊚ | ⊚ | ○ | ○ |
| 4 | D | 2.0 | 35 | ○ | ○ | ○ | ⊚ | ⊚ | ○ | ○ |
| 5 | E | 3.4 | 48 | ○ | ○ | ○ | ⊚ | ○ | ○ | ○ |
| 6 | F | 3.1 | 47 | ○ | ○ | ○ | ⊚ | ⊚ | ○ | ○ |
| Comparison Example | | | | | | | | | | |
| 1 Ink w/20% sol | G | 3.4 | 48 | ○ | x | x | ⊚ | ○ | ○ | ○ |
| 2 solvent sur. tension = 48.5 | H | 2.7 | 45 | ○ | ○ | Δ | Δ | x | Δ | x |
| 3 pigment | I | 4.3 | 49 | x | ○ | ○ | x | x | x | Δ |
| 4 No nonionic | J | 2.6 | 56 | Δ | ○ | ○ | ○ | Δ | ○ | Δ |

TABLE 1-continued

| Ink | Physical properties (25° C.) | | Storage stability | Water resistance | | Fixing characteristic | | Anti-clog characteristic | Discharge stability |
|---|---|---|---|---|---|---|---|---|---|
| | Viscosity (cP) | Surface tension (dyne/cm) | | Copy paper | Bond paper | Copy paper | Bond paper | | |
| surfactant | | | | | | | | | |

From Table 1, it will be understood that the recording liquid of the present invention and also the recording method making use of the recording liquid can record characters and other types of information with a high level of durability, particularly water resistance, and also with a high degree of fixing characteristic, even on a recording medium with exposed fibers, such as an ordinary sized paper including a copying paper, a letter paper, a bond paper and a continuous form paper, not to mention those papers specifically designed for ink jet printing.

In addition, the recording liquid in accordance with the present invention exhibits a high stability so that its properties and performance do not change even when it is stored for a long time and, hence, remarkably reduces the tendency of clogging of ink jet nozzles, thus enhancing the practicality of ink jet printing systems.

Furthermore, the recording liquid of the present invention ensures that the ink droplets are stably discharged over a wide variety of driving and environmental conditions.

What is claimed is:

1. An aqueous recording liquid, comprising: a colorant selected from the group consisting of acidic dyestuffs, direct dyestuffs, vat dyestuffs, oil-soluble dyestuffs, sulfide dyestuffs and dispersion dyestuffs, a water-soluble organic solvent, from 0.5–10 wt. % of a nonionic surfactant selected from the group consisting of polyoxyethylene alkylether, polyoxyethylene alkyl phenylether, polyoxyethylene fatty acid ester, sorbitan fatty acid ester, polyoxyethylene sorbitan fatty acid ester, polyoxyethylene alkylamine, glycerine fatty acid ester, and oxyethylene oxypropylene block polymer, and from 20–95 wt. % water, said organic solvent having a surface tension of at most 45 dyne/cm, wherein said colorant is at most 0.1 wt. % soluble in water at 20° C. and at least 3 wt. % soluble in said solvent.

2. The recording liquid of claim 1, wherein said colorant is present at from 0.2–20 wt. %.

3. The recording liquid of claim 2, wherein said solvent is present at from 5–80 wt. %.

4. The recording liquid of claim 3, wherein water is present at from 30–90 wt. %.

5. The recording liquid of claim 4, wherein said colorant is present at from 0.5–10 wt. %.

6. The recording liquid of claim 5, wherein said solvent is present at from 5–60 wt. %.

7. The recording liquid of claim 6, wherein water is present at from 40–90 wt. %.

8. The recording liquid of claim 7, wherein said colorant is present at from 1–5 wt. %.

9. The recording liquid of claim 8, wherein said solvent is present at from 10–50 wt. %.

10. The recording liquid of claim 9, wherein water is present at from 60–90 wt. %.

11. The recording liquid of claim 1, wherein said colorant is an oil-soluble dye.

12. The recording liquid of any of claims 1, 3, 6 or 9, wherein said solvent exhibits a vapor pressure of at most 0.5 mmHg at 25° C.

13. The recording liquid of claim 12, wherein said solvent is selected from the group consisting of nitrogen-containing ring compounds and mono- or bi-alkylethers of alkylene glycols.

14. The recording liquid of claim 1, wherein said liquid exhibits a viscosity of from 1–15 cP at 25° C. and a surface tension of from 30–65 dyne/cm.

* * * * *

UNITED STATES PATENT AND TRADEMARK OFFICE
CERTIFICATE OF CORRECTION

PATENT NO. : 5,067,980

DATED : November 26, 1991

INVENTOR(S) : Shoji Koike et al.

It is certified that error appears in the above-identified patent and that said Letters Patent is hereby corrected as shown below:

COLUMN 4:

Line 8, "CibaGeigy" should read --Ciba-Geigy--; and

Line 29, "abovementioned" should read --above-mentioned--.

COLUMN 5:

Line 25, "10 wt. %" should read --10 wt. %,--.

COLUMN 8:

Line 14, "Ink D" should read --Ink E--.

COLUMN 9:

Line 34, "where" should read --were--.

UNITED STATES PATENT AND TRADEMARK OFFICE
CERTIFICATE OF CORRECTION

PATENT NO. : 5,067,980

DATED : November 26, 1991

INVENTOR(S) : Shoji Koike et al.

It is certified that error appears in the above-identified patent and that said Letters Patent is hereby corrected as shown below:

COLUMN 10:

Line 36, "frequencies" should read --frequency--.

COLUMN 11:

"TABLE 1-continued" should be deleted.

Signed and Sealed this

Twentieth Day of April, 1993

Attest:

MICHAEL K. KIRK

Attesting Officer

Acting Commissioner of Patents and Trademarks